United States Patent [19]
Kester et al.

[11] Patent Number: 5,273,793
[45] Date of Patent: Dec. 28, 1993

[54] NONLINEAR OPTICAL MATERIALS

[75] Inventors: John J. Kester, Colorado Springs, Colo.; Mark D. Newsham, Midland, Mich.

[73] Assignee: The Dow Chemical Company, Midland, Mich.

[21] Appl. No.: 932,863

[22] Filed: Aug. 19, 1992

Related U.S. Application Data

[60] Division of Ser. No. 800,345, Nov. 26, 1991, Pat. No. 5,173,546, which is a continuation-in-part of Ser. No. 441,783, Nov. 27, 1989, abandoned.

[51] Int. Cl.$^5$ .................. C08G 59/44; C08G 59/50; C08G 65/00
[52] U.S. Cl. .................................... 428/1; 428/413; 204/155; 204/156; 252/299.01; 252/299.61; 252/299.68; 252/582; 252/585; 427/490; 525/504; 525/523; 528/89; 528/90; 528/93; 528/94; 528/98; 528/99; 528/108; 528/109; 528/114; 528/123; 528/124; 528/220; 528/373; 528/391; 528/407

[58] Field of Search .................. 204/155, 156; 252/299.01, 299.61, 299.68, 582, 585; 427/40, 41, 44, 47, 53.1; 428/1, 413; 525/504, 523; 528/93, 89, 90, 99, 98, 94, 108, 109, 114, 123, 124, 220, 391, 373, 407

[56] References Cited

U.S. PATENT DOCUMENTS 3,155,743 11/1964 Newey .................. 528/109
4,517,321 5/1985 Gardner et al. .......... 528/124

*Primary Examiner*—Frederick Krass

[57] ABSTRACT

The present invention is directed to epoxy-based polymeric nonlinear optical materials in which a nonlinear optical active moiety or functionality forms the crosslink between polymer chains and a process for making the nonlinear optical (NLO) epoxy polymer including heating an epoxy resin and a curing agent such as a bi- or tri-functional aromatic amine containing an electron-withdrawing group, for example, diamino diphenylsulfone and poling the mixture under high voltage at elevated temperature for a period of time to bring about orientation of the nonlinear optical moieties in the polymer. The polymers have enhanced stability over polymers in which only one end of an NLO active moiety is attached to the polymer chain.

22 Claims, No Drawings

NONLINEAR OPTICAL MATERIALS

CROSS-REFERENCE TO RELATED APPLICATION

This is a divisional of application Ser. No. 800,345 filed Nov. 26, 1991 now U.S. Pat. No. 5,173,546 which is a continuation in part of the application Ser. No. 441,783 filed Nov. 27, 1989, now abandoned.

FIELD OF THE INVENTION

The present invention relates to novel nonlinear optical materials and polymeric organic materials which possess nonlinear optical properties. More particularly, the present invention relates to crosslinked epoxy polymeric nonlinear optical materials which can be useful in nonlinear optical devices, and to a process for preparing the epoxy polymeric nonlinear optical materials.

BACKGROUND OF THE INVENTION

Information is more rapidly processed and transmitted using optical as opposed to electrical signals. There exists a need for finding nonlinear optical materials, and processes for preparing such materials, which alter the transmission of optical signals or serve to couple optical devices to electrical devices, i.e., electrooptic devices.

Some materials which have been used in electrooptic devices include semiconductors such as lithium niobate, potassium titanyl phosphate and gallium arsenide and most recently, organic materials which have been doped with nonlinear optical materials. Generally, polymeric organic materials can or may have the specific advantages of fast response time, small dielectric constant, good linear optical properties, large nonlinear optical susceptibilities, high damage threshold, engineering capabilities, and ease of fabrication.

There are various known polymeric organic materials which possess specific nonlinear optical properties and various known processes for making such polymeric organic materials. Many of the current polymeric organic materials prepared by the prior art are prepared by blending a NLO molecule into a polymer host material. "Blending" herein means a combination or mixture of materials without significant reaction between specific components.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 183. The above-recited publications are incorporated herein by reference.

EP 218,938 discloses one method of making a polymer with nonlinear optical properties by incorporating molecules which have nonlinear optical (NLO) properties into a host polymer. The NLO molecules are incorporated into the host polymer by blending. The NLO molecules in the polymer can be aligned by an electric field while the temperature of the polymeric material is raised above its glass transition temperature and then cooled to room temperature. EP 218,938 discloses a number of polymer host materials, including epoxies, and many types of molecules which have NLO activity including azo dyes such as Disperse Red 1.

PCT Application W08802131A also describes a method of blending a substance having nonlinear optical properties, such as 2-methyl-4-nitroaniline, into a commercially available curable epoxy resin polymer to prepare an electrooptical material.

It is also known to incorporate a NLO active group such as azo dye Disperse Red 1 (4,-[N-ethyl-N-(2-hydroxyethyl] amino-4-nitro azobenzene), by simply blending the azo dye in a thermoplastic material such as poly(methylmethacrylate), as described in Applied Physics Letters 49(5), 4 (1986). In this paper, an aromatic amine is disclosed but the amine is not covalently bonded to the polymer chain. In addition, the paper discloses an NLO molecule which has an electron donor and acceptor group at either end of the molecule.

A problem associated with a polymer with NLO properties produced by simply blending NLO molecules into a host polymer is that these polymer materials lack stability of orientation, i.e., there is a great amount of molecular relaxation or reorientation within a short period of time resulting in a loss of NLO properties. For example, as reported by Hampsch et al., Macromolecules 1988, 21, 528–530, the NLO activity of a polymer with NLO molecules blended therein decreases dramatically over a period of days.

Generally, the incorporation of molecular structures which have NLO activity into the backbone of a polymer chain will decrease the likelihood of the structural reorganization in comparison with polymers in which the NLO active molecule is simply blended. It is therefore desirable to provide a polymer material with NLO groups covalently bonded to the backbone of the polymer material to minimize relaxation effects.

U.S. Pat. No. 4,703,096 discloses a polymer composition in which the NLO activity is derived from aromatic structures attached to a polymeric diacetylenic backbone. However, the synthesis of the material described in U.S. Pat. No. 4,703,096 is complicated.

There is a continuing effort to develop new nonlinear optical polymers with increased nonlinear optical susceptibilities and enhanced stability of nonlinear optical effects. It would be highly desirable to have organic polymeric materials, particularly polymeric materials based on epoxy resins, with larger second and third order nonlinear properties than presently used inorganic electrooptic materials.

Amine curing agents have long been used as curing agents for epoxy resins. Amine curing agents are discussed in Lee and Neville, *Handbook of Epoxy Resins*, McGraw Hill (1967), pages 8-1 to 8-18. Amine curing agents are also discussed in U.S. Pat. Nos. 4,330,659; 4,814,414 and 4,822,832.

It is an object of the present invention to provide a nonlinear optical material as a curing agent for epoxy resins and epoxy resins cured with said nonlinear optical material.

Another object of the present invention is to provide crosslinked epoxy based polymers which exhibit nonlinear optical effects and which have enhanced stability of nonlinear optical effects.

SUMMARY OF THE INVENTION

One aspect of the present invention is a non-linear optical material comprising a compound exhibiting non-linear optical properties, represented by the formula:

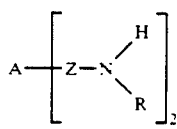

or by the formula:

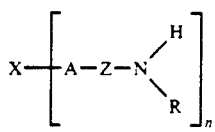

wherein A is a divalent electron-withdrawing group; Z is a conjugated electronic structure, R is independently a hydrogen, or an aliphatic, cycloaliphatic or aromatic hydrocarbon having from 1 to about 12 carbon atoms; n is 2 or 3; and X is a divalent or a trivalent organic hydrocarbon, hetero-interrupted hydrocarbon, substituted hydrocarbon radical, or

with the proviso that there are no intervening methylene groups between A and Z, or between A and X.

Another aspect of the present invention is a nonlinear optical composition comprising the reaction product of:
(I) at least one compound containing an average of more than one epoxide group per molecule; and
(II) at least one curing agent for compound (I) whereby at least a portion of said curing agent (II) is at least a first curing agent represented by the formula:

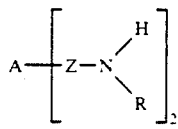

or by the formula:

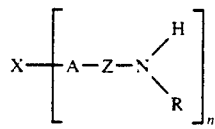

wherein A is a divalent electron-withdrawing group; Z is a conjugated electronic structure, R is independently a hydrogen, or an aliphatic, cycloaliphatic or aromatic hydrocarbon having from 1 to about 12 carbon atoms; n is 2 or 3; and X is a divalent or a trivalent organic hydrocarbon, hetero-interrupted hydrocarbon, substituted hydrocarbon radical, or

with the proviso that there are no intervening methylene groups between A and Z, or between A and X.

Another broad aspect of the invention is a process for making the above compositions.

Still another aspect of the present invention includes devices having incorporated therein a nonlinear optical component of the above materials.

DETAILED DESCRIPTION OF PREFERRED EMBODIMENTS

In its broadest scope, the present invention provides a nonlinear optical active material comprising a compound exhibiting nonlinear optical properties, represented by the formula:

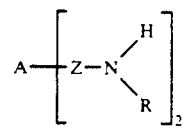

or by the formula:

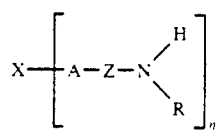

wherein A is a divalent electron-withdrawing group; Z is a conjugated electronic structure, R is independently a hydrogen, or an aliphatic, cycloaliphatic or aromatic hydrocarbon having from 1 to about 12 carbon atoms; n is 2 or 3; and X is a divalent or trivalent organic hydrocarbon, hetero-interrupted hydrocarbon, substituted hydrocarbon radical, or

with the proviso that there are no intervening methylene groups between A and Z, or between A and X.

In one embodiment, the nonlinear optical material may have the following formula:

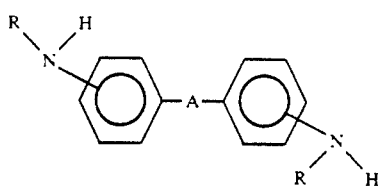

Formula I wherein A and R are as defined hereinabove with the proviso that there are no methylene groups attached to A.

In another embodiment, the nonlinear optical material may have the following formula:

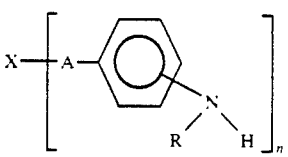

Formula II wherein A, X, and R are as defined hereinabove with the proviso that there are no methylene groups between A and X, or between A and the phenyl group.

The term "electron-withdrawing" as employed herein refers to organic substituents which attract n-electrons from a conjugated electronic structure. Illustrative of electron-withdrawing substituents which are employed herein represented by A in the above formulae include, for example,

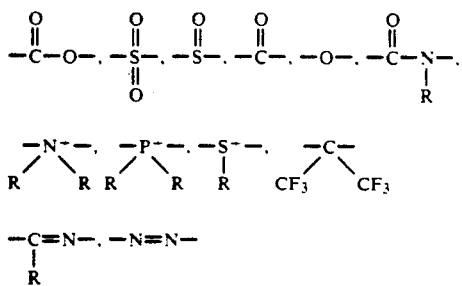

where each R is independently a hydrogen or an aliphatic, cycloaliphatic or aromatic hydrocarbon having from 1 to about 12 carbon atoms, and the like.

The term "conjugated electronic structure" as employed herein refers to a group which has the ability to transfer charge from the electron-donating group to the electron withdrawing group through a conjugated system of double bonds. Conjugated electronic structures include groups which have, for example, a hydrocarbyl radical composed of aromatic rings optionally linked by carbon-carbon, carbon-nitrogen, or nitrogen-nitrogen double bonds. This conjugating group may be substituted with pendant radicals such as alkyl, aryl, cyano, halo, and nitro.

The term "electron-donating" as employed herein refers to organic substituents which contribute n-electrons to a conjugated electronic structure. Illustrative of electron-donating substituents include for example, amino, alkyl-amino, and the like.

The nonlinear optical composition of the present invention includes an epoxy-containing polymeric material having nonlinear optical moieties or functionalities chemically bonded to the resultant polymeric material. The nonlinear optical moieties are crosslinking groups attached to backbones of the polymeric material. The NLO crosslinking group of the present invention is a moiety with at least two ends having an electron-donating group (donor) with an electron-withdrawing group (acceptor) being in the middle. Both ends of the NLO active moiety are tied into a polymer chain to provide enhanced stability over other NLO moiety in which only one end is tied to the polymer backbone.

Because of the presence of a charge asymmetry in the polymer of the present invention, the present invention polymer with a noncentrosymmetric molecular configuration advantageously exhibits second order nonlinear optical susceptibility.

The crosslinking functionalities of the composition of the present invention are provided by the first curing agent which are preferably those curing agents described by the following general formulae:

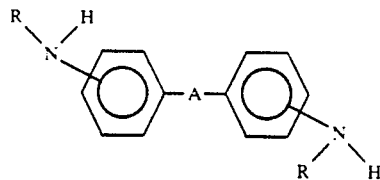

Formula I where A is a divalent electron-withdrawing group and each R is independently a hydrogen or an aliphatic, cycloaliphatic or aromatic hydrocarbon having from 1 to about 12 carbon atoms with the proviso that there are no methylene groups attached to A; or those curing agents represented by the following formula:

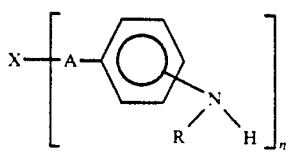

where A is a divalent electron-withdrawing group; n is 2 or 3; each R is independently a hydrogen or an aliphatic, cycloaliphatic or aromatic hydrocarbon having from 1 to about 12 carbon atoms; and X is a divalent or trivalent organic hydrocarbon, hetero-interrupted hydrocarbon, or substituted hydrocarbon radical, or

with the proviso that there are no methylene groups between A and X, or between A and the phenyl group.

In a preferred embodiment, the electron-withdrawing group A in the above formulae is $SO_2$ or CO.

In accordance with one embodiment of the present invention a nonlinear optical material having the crosslinking functionalities of the above formulae is produced by reacting an epoxy-containing compound, as a first component (I), with a compound which provides a nonlinear optical molecule to the resultant product composition, as a second component (II).

The first component (I) of the present invention includes a wide variety of epoxy-containing compounds. Generally, the first component (I) is any compound having an average of more than one epoxide group per molecule. Preferably, the first component (I) is any compound having an average of more than one vicinal epoxide group per molecule. More preferably, the component (I) may be any compound containing an average of more than one glycidyl group per molecule. Even more preferably, the component (I) can be glycidyl ethers, glycidyl esters or glycidyl amines.

Illustrative of the preferred glycidyl ethers used in the present invention are the glycidyl ethers of polyhydric phenols including for example, the glycidyl ethers of phenol or substituted phenol such as the aldehyde novolac resins, particularly phenol-formaldehyde resins and cresol-formaldehyde resins. The glycidyl ethers of polyhydric phenols also may include the glycidyl ethers of bisphenols or substituted bisphenols such as the glycidyl ether of bisphenol A. Other examples of glycidyl ethers of polyhydric phenols useful in the present invention are described in U.S. Pat. No. 4,330,659 incorporated herein by reference, for example diglycidyl ethers of bisphenols corresponding to the formula:

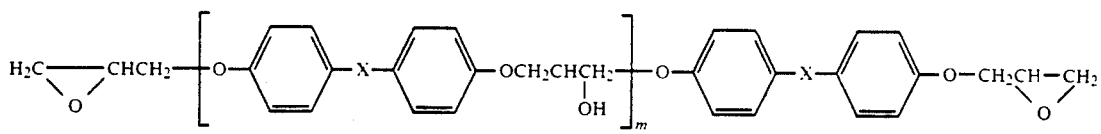

wherein m is from 0 to about 50 and X is —CH$_2$—,

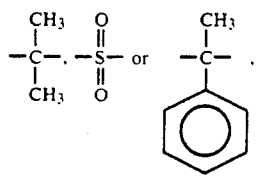

These represent, respectively, bisphenols F, A, S and AP. Other applicable ethers include the diglycidyl ethers of resorcinol, catechol, hydroquinone, and the like. The various ethers may be substituted on the respective phenyl rings by such non-reactive substituents as alkyl, halogen, and the like. The glycidyl ethers of compounds having more than one aromatic hydroxyl group per molecule are disclosed in U.S. Pat. No. 4,829,133, incorporated herein by reference for the teachings of these epoxy resins. The glycidyl ethers of hydrocarbon-phenol resins disclosed in U.S. Pat. No. 4,710,429, incorporated herein by reference, may also be used in the present invention.

Component (I) of the present invention also includes di- or polyepoxides of aliphatic or cycloaliphatic compounds containing more than one epoxidizable unsaturated group, for example, the diepoxides of cyclohexadiene, butadiene and the like.

The epoxy-containing compound suitably used herein can be a monomer or an oligomer or a polymeric resin. Epoxy monomers and oligomer units suitably used herein are described in the *Encyclopedia of Chemical Technology*, vol. 9, pp 267–290, published by John Wiley & Sons, 1980. Examples of the epoxy resins suitably used herein include novolac epoxy resins such as cresol-novolac epoxy resins and epoxy phenol novolac resin; bisphenol-A epoxy resins such as diglycidyl ethers of bisphenol A; cycloalkyl epoxy resins; glycidyl amine resins; triazine resins; hydantoin epoxy resins and combinations thereof.

Some commercial epoxy resins useful in the present invention include, for example, D.E.R. TM 331, D.E.R. TM 332, D.E.R. TM 383, D.E.R. TM 431 and D.E.R. TM 736, all commercially available from The Dow Chemical Company. A trifunctional epoxy resin Tactix ® 742, based on 4,4',4"- trihydroxyphenyl methane, and commercially available from The Dow Chemical Company, is most suitably used in the present invention.

Any combination of the aforementioned epoxy-containing compounds may be used herein. Therefore, another embodiment of the present invention is the use of a mixture or a blend of epoxy-containing compounds as component (I). The epoxy compositions may contain the same or other moieties with electron-withdrawing groups.

The epoxy compound used herein may be an epoxy compound which does not exhibit a NLO response or an epoxy compound which does exhibit a NLO response. For example, an epoxy compound which exhibits an NLO response and which may be used in the present invention may be an epoxy compound described in U.S. patent application Ser. No. 441,805, now U.S. Pat. No. 5,112,934, filed Nov. 27, 1989, by Kester et al., incorporated herein by reference. An example of an epoxy compound, disclosed in U.S. Ser. No. 441,805, now U.S. Pat. No. 5,112,934, which exhibits an NLO response and may be used herein is tetraglycidylsulfonyldianiline.

A solvent may be used, if desired, to dissolve an epoxy compound for example when using certain solid epoxy resins. Suitable solvents which can be employed herein include, for example, glycol ethers, ketones, aromatic hydrocarbons, alcohols, amides, combinations thereof and the like. Particularly suitable solvents employed herein include, for example, methyl ethyl ketone, acetone, methanol, dimethylformamide, ethylene glycol methyl ether, propylene glycol methyl ether, dimethylacetamide, combinations thereof and the like.

The second component (II) of the present invention is a curing agent for component (I). At least a portion of the curing agent (II) is advantageously a first curing agent compound exhibiting nonlinear optical properties, represented by the formula:

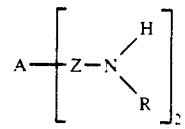

or by the formula:

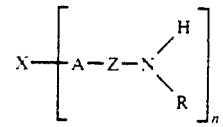

wherein A is a divalent electron-withdrawing group; Z is a conjugated electronic structure, R is independently a hydrogen, or an aliphatic, cycloaliphatic or aromatic hydrocarbon having from 1 to about 12 carbon atoms; n is 2 or 3; and X is a divalent or trivalent organic hydrocarbon, hetero-interrupted hydrocarbon, substituted hydrocarbon radical, or

with the proviso that there are no intervening methylene groups between A and Z, or between A and X.

The Hammett constant ($\sigma$) is a measure of the level of electron withdrawing capability of a substituent. This well known constant is described in many references, for instance, J. March *Advanced Organic Chemistry* (McGraw Hill Book Company, New York, 1977 edition) p. 251-259. The Hammett constant values are negative for an electron donating group (e.g. $\sigma_p = -0.66$ for $NH_2$) and are positive for electron withdrawing groups (e.g. $\sigma_p = 0.78$ for a nitro group), where $\sigma_p$ indicates para substitution.

The type of divalent electron-withdrawing groups useful in the present invention are, preferably, any substituent which has a positive Hammett constant. More preferably, electron-withdrawing groups have a Hammett constant of $\sigma_p$ greater than 0.50, and even more preferably greater than 0.60.

Component (II) of the present invention may comprise substantially all of the first curing agent compound or component (II) may be a mixture of two or more curing agents wherein at least a portion of component (II) is at least one first curing agent and the remainder of component (II) is one or more second curing agent compounds.

Suitable second curing agent compounds which can be employed herein include, for example, amines, acids or anhydrides thereof, biguanides, imidazoles, ureaaldehyde resins, melamine-aldehyde resins, phenolics, halogenated phenolics, sulfides, combinations thereof and the like. These and other curing agents are disclosed in Lee and Neville's *Handbook of Epoxy Resins*, McGraw-Hill Book Co., 1967 which is incorporated herein by reference. Particularly suitable curing agents include, for example, dicyandiamide, diaminodiphenylsulfone, 2-methylimidazole, diethylenetoluenediamine, bisphenol A, tetrabromobisphenol A, phenolformaldehyde novolac resins, halogenated phenolformaldehyde resins, hydrocarbon-phenol resins, combinations thereof and the like.

The amines suitably employed herein can be multifunctional aliphatic, such as, diethylene triamine or triethylenetetramine, or aromatic amines, such as, meta-phenylene diamine or methylene dianiline. Some commercial curing agents useful in the present invention include D.E.H. TM 20 and D.E.H. TM 24, commercially available from The Dow Chemical Company.

The second curing agent compound may be a compound which does not exhibit a NLO response or a compound which does exhibit a NLO response. For example, a second curing agent compound which exhibits a NLO response and which may be used in the present invention may be a compound described in U.S. patent application Ser. No. 441,731, filed Nov. 27, 1989, by J. J. Kester, incorporated herein by reference. An example of a second curing agent disclosed in U.S. Ser. No. 441,731 which exhibits a NLO response and may be suitably used herein is p-nitroaniline.

Examples of other second curing agents which can be used in the present invention include, for example, the amines disclosed in U.S. Pat. Nos. 4,659,177; 4,707,303 and 4,707,305 which are hereby incorporated by reference, such as quinodimethane compounds, diphenoquinodimethane compounds and naphthoquinodimethane compounds.

The compositions of the present invention advantageously exhibit a nonlinear optical response. The nonlinear optical material of the present invention comprises an epoxy resin based composition having nonlinear optical moieties chemically bonded to the resultant polymer. The nonlinear optical moieties of the epoxy polymer are crosslinking groups attached to the backbone of the polymeric material.

Generally, the amounts of components (I) and (II) employed herein are sufficient to provide a cured product. Usually the total amounts of components (I) and (II) which provide a ratio of equivalents of curing agent per epoxy groups of from about 0.5 to about 1.2; preferably from about 0.75 to about 1.1 and more preferably from about 0.95 to about 1.05 are used herein.

The percentage of first curing agent should be sufficient to provide the final cured product with NLO properties. Generally the percent of first curing agent used herein may be from about 0.1 percent to about 100 percent with respect to the stoichiometry of the epoxy groups. It is preferable to use at or near 100 percent of the first curing agent. The percentage of the second curing agent used may be the remainder if anything less than 100 percent of the first curing agent is used, e.g. from 0 to about 99.9 percent.

Various factors will effect the range of the percentage of first and second curing agents relative to the number of epoxy groups. These factors include the optical absorption of the NLO group, the level of stability required, and the strength of the NLO group. In general, the level of addition of NLO moieties to polymer will be as high as possible to maximize the NLO effect. The level in addition will be balanced by the stability and quality of the film desired to be produced.

In carrying out one embodiment of the process of the present invention, component (I), for example, an epoxy-containing compound, is reacted with component (II), for example, an aromatic amine, under reaction conditions to form the composition of the present invention. For example, a class of anisotropic polymers is produced from reacting an epoxy resin with the monomers of Formulae I and II.

Because of the relative unreactivity of the first curing agent containing electron-withdrawing substituents it may be desirable to employ a catalyst.

Suitable catalysts which can be employed in the preparation of the compositions of the present invention may include, for example, tertiary amines, imidazoles, phosphonium compounds, ammonium compounds, sulfonium compounds, mixtures thereof and the like.

Suitable tertiary amines include, for example, triethylenediamine, N-methylmorpholine, triethylamine, tributylamine, benzyldimethylamine, tris(dimethylaminomethyl)phenol, mixtures thereof and the like.

Suitable imidazoles include, for example, 2-methylimidazole, 1-propylimidazole, mixtures thereof and the like.

Suitable phosphonium compounds include, for example, those disclosed by Dante et al. in U.S. Pat. No. 3,477,990, Perry in Canadian Pat. No. 893,191 and U.S. Pat. No. 3,948,855 and by Tyler, Jr. et al. in U.S. Pat. No. 4,366,295 all of which are incorporated herein by reference.

Suitable quaternary ammonium compounds include, for example, benzyl trimethyl ammonium chloride, benzyl trimethyl ammonium hydroxide, tetrabutyl ammonium chloride, tetrabutyl ammonium hydroxide, mixtures thereof and the like.

Preferred catalysts which are suitably used herein include, for example, tetrabutylphosphonium acetate, boron trifluoride monoethylamine, benzyldimethyl amine, and 2-methyl imidazole. The most preferred catalyst is 2-methyl imidazole due to the reduction in ionic species in the resulting product material by its use. The reduction of ionic species in the polymer material is important for its reduction of conductivity which can lead to a catastrophic breakdown during the orientation process of the polymer product.

The reaction condition used in the present invention will vary depending on the particular reactants used. Generally, the reactants, i.e., components (I) and (II) are mixed together to form a solution and then heated to a temperature such that the components will react. The reaction process of the present invention is preferably carried out at a temperature of from about room temperature (about 20° C.) to about 300° C. and more preferably from about room temperature to about 250° C. Above about 300° C. degradation of the epoxy polymer may occur and below about room temperature no reaction may occur. Optionally, the reactants are degassed to less than about $1 \times 10^{-2}$ Torr. The degassing is preferred to remove bubbles and moisture which may degrade the final product. The degassing is generally carried out a temperature at which the reactants have a reduced viscosity. While the degassing temperature depends on the reactants used, generally the degassing temperature is below the temperature of sublimation of reactants or below the reaction temperature. The reaction process of the present invention is preferably carried out under an inert atmosphere such as nitrogen. The reaction mixture is heated under nitrogen until a substantially polymerized product is obtained. Generally, the period of time for the reaction depends on the kinetics of the particular reactants, but preferably the reaction time is less than 5 hours and more preferably less than 1 hour. The reacted mixture is then cooled to room temperature for use.

As an illustration of another embodiment of the process of the present invention, a prepolymer is first prepared by reacting component (I) with less than 100 percent of a first curing agent and then reacting the prepolymer with a second curing agent.

The second curing agent compound may be used to substantially completely react a prepolymer which has been prepared by reacting less than 100 percent of a first curing agent (an NLO molecule) with an epoxy resin. It is possible to completely use the prepolymer by continuing homopolymerization brought about by a catalyst. The prepolymer may be fully cured using a second curing agent such as metaphenylinediamine, because the final product exhibits certain improved properties obtained by using the second curing agent such as greater stability and higher glass transition temperature. The prepolymer may be used, for example, to provide a final product with improved properties such as film quality, optical clarity and stability. A sufficient amount of the second curing agent is added to the prepolymer to substantially react all of the remaining epoxy groups.

The present invention provides a thermoset polymeric composition with good thermal stability and resistance to chemical attack. It is also advantageous to provide epoxy based polymers having NLO properties because epoxy based polymers per se have heretofore been shown to have resistance to chemical attack. This property is provided by the crosslinking of the polymeric chains during polymerization.

The polymeric material of the present invention generally has a glass transition temperature of from about 90° C. to about 300° C., preferably above about 140° C. and more preferably above about 160° C.

The present invention provides a composition with nonlinear optical properties with improved stability. The increased stability arises form the incorporation of a NLO group into the backbone of a polymer as opposed to blending a molecule with electron-withdrawing groups with a polymer host.

The epoxy based thermoset compositions of the present invention can be in the form of sheets, films, fibers or other shaped articles by conventional techniques. Generally, films are used in testing, electrooptic devices and waveguide applications.

A film can be prepared, for example, by constraining a mixture of components (I) and (II) between two planar substrates and then polymerizing the mixture to form a thin film. The films used for testing electrooptic devices and waveguides should be thin films. Generally, the film has a thickness of from about 0.5 μm to about 500 μm. Preferably, the thickness of the film is from about 1 μm to about 25 μm.

The mixture of epoxy resins reacted with a first curing agent (aromatic amines with electron-withdrawing groups), possibly with the addition of other curing agents is placed on a surface to make a film. The film may be produced in a number of ways. For many prepolymer mixtures with low viscosity a substrate is required. The mixture may be spread over the surface by compression with another substrate, or by dip, spray, or spin coating. Thermal processing of the mixture disposed on a substrate and the ultimate thermal and mechanical properties of the resultant polymer are dependent on the type of epoxy resin and curing agent utilized. The degree of stability required will then determine the type of polymer components needed. The techniques for mixing and polymerizing are similar to those known in the art. One aspect of the polymerization which improves the mechanical properties of the film is the schedule of temperature ramping of the mixture to its final cure temperature. By staging the cure at intermediate temperatures the optimal network structure is obtained. Retaining the final cure temperature for a period of hours is often necessary for the most complete polymerization possible. The long term chemical and mechanical stability of the final polymer will be dependent on the network formed.

After the polymerization of the mixture, the resulting film is oriented to produce a film with a net anisotropic structure needed for second harmonic generation. Orientation of the film is provided by applying an external field to the film.

The term "external field" as employed herein refers to an electric, magnetic or mechanical stress field which is applied to a substrate of mobile organic molecules to induce dipolar alignment of the molecules parallel to the field.

Generally, in preparing NLO materials with second order susceptibility, $X^{(2)}$, the NLO functionalities in the polymer must have a net alignment for the polymer to exhibit NLO properties. Typically, an electric field is applied to orient the moieties in the polymer for nonlinear optical effect. This type of orientation is referred to herein as electric field poling, parallel plate poling, or poling.

Application of an electric field produces orientation by torque due to the interaction of the applied field and the net molecular dipole moment.

In electric field poling, the polymeric material is raised above its glass transition temperature, $T_g$, because in this state, large molecular motion is enhanced, and the nonlinear optic moieties can give a net orientation. However, orientation of the polymer has also been observed to occur below the $T_g$. An intense electric field is then applied to the polymeric composition to align the nonlinear optic moieties. Electric field strengths of between about 0.05 to about 1.5 megavolts per centimeter (MV/cm) can be applied. The film is then cooled to room temperature with the electric field still applied. The field is then removed, resulting in a system where the nonlinear optic moieties are aligned within the polymer matrix.

The orientation can also be achieved by corona poling or parallel plate poling. In parallel plate poling, the film is placed in between and parallel to two, parallel planar electrodes maintained at a sufficient electrical potential difference to orient the polymer while the polymer is heated to a temperature near to or above its glass transition temperature. The electrodes can be associated with the substrate used for the formation of the film. For example, the substrate can be coated with a layer of indium-tin-oxide. If there are ionic impurities in the polymer mixture then the electrodes may be shielded with dielectric layer to prevent electrical breakdown. To obtain free standing films after the orientation process, a release layer is often deposited on the substrate before the mixture is placed onto it. Other configurations involving air or vacuum gaps can also be used. The electric field continues to be applied until the temperature of the polymer is reduced to room temperature. This allows for the relaxation of the polymer to its highest density while still having the field applied. This densification should reduce any relaxation due to mobility of pendant side-chains within voids in the polymer.

Other conventional methods for the orientation of the NLO moieties can be carried out by corona poling or through stretching the polymer.

Mechanical stress induced alignment includes a physical method such as stretching a thin film or a chemical method such as coating a liquid crystalline surface with an aligning polymer such as nylon.

The orientation of the anisotropic units within the film can occur during or after polymerization. One method of orientation includes applying an electric field to a polymer film which has previously been prepared and polymerized.

Another method of orientation of the polymer of the present invention for producing nonlinear optical materials, includes polymerizing the polymer while the polymer is under an electric field such that the nonlinear optical moieties are aligned in the electric field before complete polymerization of the polymer takes place. This method of orientation will produce less stress on the ultimate polymer chain than if the electric field is applied after the NLO moieties are incorporated into the backbone of the polymer.

Another method for preparing thin films for nonlinear optical applications includes annealing of the polymer while simultaneously poling the polymer which will allow relaxation of the polymer around the oriented molecule. After the temperature of a polymer has been raised to above the Tg and the polymer has been poled, the temperature is reduced from about 10° C. to about 30° C. below the Tg and maintained at this lower temperature to allow for densification. This "annealing" step is carried out so as to cause a reduced free volume in the film and thus less room for NLO moieties to randomly reorient themselves which can lead to a decrease in the NLO signal. Thus, this annealing process during polymer orientation may advantageously improve the stability of the polymer.

The nonlinear optical response of a polymer is determined by the susceptibility of the polymer to polarization by an oscillating electromagnetic field. The most important polarization components of a medium in contact with an electric field are the first order polarization components, i.e., the linear polarization, the second order polarization, i.e., the first nonlinear polarization, and the third order polarization, i.e., the second nonlinear polarization. On a macroscopic level this can be expressed as:

$$P = X^{(1)}E(\omega_1) + X^{(2)}E(\omega_1)E(\omega_2) + X^{(3)}E(\omega_1)(\omega_2)(\omega_3)$$

where
P is the total induced polarization
E is the electric field at the frequency $(\omega_i)$, and
$X^i$ are the susceptibility tensors for the linear, and first and second order nonlinear component of the polarization.

Specific components of the susceptibility tensor can be related to measurable coefficients. For second harmonic generation the second harmonic coefficient $d_{ijk}$ is defined by:

$$d_{ijk}(-2\omega; \omega, \omega) = (\tfrac{1}{2}) X_{ijk}(-2\omega; \omega, \omega).$$

Because of the degeneracy of two of the fields in second harmonic generation, the standard notation for writing this coefficient is $d_{iu}(-2\omega; \omega, \omega)$. For the specific case where polymer films are oriented with their anisotropic components normal to the film surface the coefficient $d_{33}$ can be determined as detailed in, K. Singer, et al., *Applied Physics Letters* vol. 49(5), p. 248-250 (1986). From a knowledge of the susceptibilities, the molecular polarizabilities can be calculated if the molecular dipole moment, the number density of the nonlinear molecules, the internal electric field, and correction factors for local field effects are known. This calculation, also detailed in the above article, allows the determination of the first order hyperpolarizability, $\beta$, and the second order hyperpolarizability, Y. To achieve a significant second order polarization it is essential that the nonlinear medium's second order susceptibility, $X^{(2)}$, be greater than $10^{-9}$ esu. To achieve a significant third order polarization it is essential that the nonlinear medium's third order susceptibility, $X^{(3)}$, be greater than $10^{-13}$ esu.

A number of optical tests can be used to evaluate the nonlinear optical properties of the poled polymer films of the present invention. For example, the second order susceptibility components of the polymer can be tested by measuring the linear Pockels electro-optic effect, second harmonic generation (SHG), or frequency mixing. For example, the third order susceptibility components of the polymer can be measured by third harmonic generation (THG), nonlinear mixing, Kerr effect, degenerate four wave mixing, intensity dependent refractive index, self-focusing, quadratic Kerr electro-optic effect, and electric field induced second harmonic generation. Such optical tests and procedures are well known to those skilled in the art.

The Maker fringe technique is a conventional procedure used herein to determine the second order susceptibility properties of films. In accordance with this test procedure, the magnitude of the intensity of the light generated at the second harmonic of the incident frequency by the polymeric film sample can be measured as a function of the incident angle of the light irradiating the sample surface. If the film is oriented such that the anisotropic groups have a net orientation normal to the surface the largest second harmonic coefficient. $d_{33}$. can be determined using p-polarized incident radiation.

Typically a Q-switched Yd:YAG laser which emits electromagnetic radiation at 1.064 μm, has a pulse half width of 14 ns, a repetition rate of 10 Hz, and is p-polarized, is focused onto a sample on the rotation axis of a rotary stage. The light emitted from the sample is filtered to remove the incident frequency with a spike filter, centered near the second harmonic, to allow passage of substantially only the second harmonic. Typically, the spike filter is centered at 530 nm and has a half width of 10 nm. The light is detected by a photomultiplier and averaged by a boxcar which is triggered by the incoming laser pulse. The averaged output of the boxcar is collected by a computer as a function of the angle of incidence of the incident beam on the sample.

The second harmonic coefficient is calculated using the equations described in K. Singer et al., Id. The incident energy density on the sample is obtained by calibration with a known quartz sample. A Y cut quartz slab is placed on the rotation stage in the same position as the polymer sample to be tested. The energy density is calculated from the given equations knowing the coefficient $d_{11} = 1.1 \times 10^{-9}$ esu. The intensity as a function of incident angle for the polymer test sample is then fit by the computer with the additional information of incident energy density, film thickness, and indices of refraction at the incident and second harmonic wavelength collected. By fitting this data to known equations a value of energy density is obtained. This is used to fit the data for a polymeric sample. For example, the index of refraction of the film at 1.064 μm wavelength is input as 1.57 and the index at 532 nanometers is input as 1.55.

A polymeric sample film is positioned on a rotation stage and illuminated by a beam from a Nd:YAG laser with a 10 nanosecond pulse width and a repetition rate of 30 Hz. The beam energy is reduced to 0.02 millijoules/pulse and focused to a spot of approximately 100 μm. The incident beam having a wavelength of 1.064 μm is filtered to remove any higher frequencies and polarized for p-polarized incidence on the sample. The transmitted radiation through the sample is filtered to remove any radiation at 1.064 μm. This filtered radiation illuminated a photomulipler tube. The signal is averaged by a boxcar averager and sent to a computer. The sample is rotated on an axis perpendicular to the incident light and the transmitted radiation is monitored as a function of incident angle.

The films are tested for SHG capabilities. The energy density of the incident laser beam is calculated from the SHG signal from a single crystal of Y-cut quartz. The angular scan of the second harmonic intensity for quartz. The second harmonic signal is increasing in the negative direction. The oscillations observed are due to the interference of the two second harmonic waves that are generated in the material and travel in slightly different directions. These waves interfere constructively and destructively with one another depending on the distance the wave travels.

The polymers of the present invention have high stability (both thermal and chemical). An important feature of the NLO polymers derived from epoxy resins of the present invention is an added stability of the NLO signal of said polymers because the NLO groups are covalently bound into the polymer chain. This improvement of the stability is related to the level of crosslinking of the polymer chain.

Enhanced stability may be determined by observing the decay of the NLO capabilities as a function of time at room temperature. However, this determination may be very time consuming. A more straight forward approach to determining stability is to observe the NLO signal at room temperature after exposure to elevated temperatures for periods of time necessary to allow relaxation of the NLO effect. It has been found that the relaxation of the NLO effect is very rapid and the level is dependent on the temperature. The higher the temperature before relaxation of the NLO effect the more stable the polymer will be at room temperature. It is possible to calculate an activation energy for the relaxation of a particular NLO polymer. Another measure of the stability of a polymer's NLO effect is the ability to retain a certain percentage of its original NLO activity after exposure to an elevated temperature. One standard percentage would be 67.5 percent of the original value. The definition of a "stable" NLO polymer herein means the polymer's ability to retain greater than about 67.5 percent of its original NLO activity after exposure to a specified temperature for 15 minutes.

Nonlinear optical materials have many potential applications using harmonic generation for shifting laser light to shorter wavelengths, parametric oscillation for shifting laser light to longer wavelengths, phase conjugation (four-wave mixing), and sum frequency generation for applications such as modulation and switching of light signals, imagining/processing/correlation, optical communications, optical computing, holographic optical memories, and spatial light modulators.

The films of the present invention are particularly useful in the electronic and communications fields to alter incident electromagnetic waves by the optical properties of the films. More particularly, the films of the present invention are used for waveguides and electrooptic modulators.

In another embodiment of this invention, there is provided an electrooptic light modulator or optical parametric device with a (noncrystalline second order) polymeric nonlinear optical component and a means for providing an optical input to and output from said component. The component comprises an optically transparent medium of a polymer characterized by the reaction products of an epoxy resin compound (I) and a curing agent compound (II) whereby at least a portion of the curing agent (II) is at least a first curing agent exhibiting nonlinear optical properties, represented by the formula:

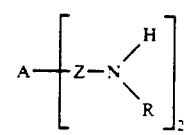

or by the formula:

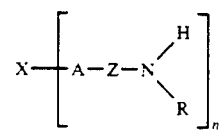

wherein A is a divalent electron-withdrawing group; Z is a conjugated electronic structure, R is independently a hydrogen, or an aliphatic, cycloaliphatic or aromatic hydrocarbon having from 1 to about 12 carbon atoms; n is 2 or 3; and X is a divalent or trivalent organic hydrocarbon, hetero-interrupted hydrocarbon, substituted hydrocarbon radical, or $$-\underset{|}{N}-;$$

with the proviso that there are no intervening methylene groups between A and Z, or between A and X. When the device is employed in an electrooptic mode it includes means for applying an electric field and/or optical input to said element for altering an optical property.

One problem in obtaining an optically nonlinear medium for device applications is the difficulty in providing stable uniform crystalline structures and thin films of such materials in a manner suitable for integrated devices. A media has been developed which is used in electrooptic and optical parametric devices which provide improved stability by means of incorporation of NLO active functionalities into the backbone of non-crystalline epoxy based polymers.

The basis for any nonlinear optical device is the nonlinear optical medium therein. It has been found that to obtain a long lived polymeric media comprising an oriented second order nonlinear material that the NLO active component must be bound into the polymer chain to provide the stabilization to thermal forces which would randomize the orientation. Such a nonlinear optical media can be prepared directly on a desired substrate or can be a free standing film or tape. It may be noted that this optically nonlinear media can be utilized as an optical waveguide incorporated into electrooptic devices.

Media which can be used in electrooptic devices are described in the following examples. The films suitable for use in electrooptic devices may be either free standing or on substrates. The substrates may be rigid as in the case of glass, quartz, aluminum, silicon wafer, or indium-tin-oxide coated glass. For use in waveguide devices the NLO media must be adjacent to another media suitable for waveguiding conditions, for example, other polymeric materials with a lower index of refraction, such as, fluorinated hydrocarbon materials, or quartz or glass substrates. Electrodes of conductive material with a higher index of refraction may be coated with polymeric materials of lower index to allow electrooptic modulation.

The following examples are for illustrative purposes only and are not to be construed as limiting the scope of the invention in any manner.

EXAMPLES 1-4

These examples illustrate the preparation of a film exhibiting non-linear optical response.

5.39 g of diglycidyl ether of bisphenol A (DGEBA) having an epoxide equivalent weight (EEW) of 180.5 was combined with 1.85 g of diamino diphenyl sulfone (DADS) having an amine equivalent weight of 62.1 in a 100 ml boiling flask. The mixture was heated briefly under vacuum to about 160° C. to allow dissolution of the DADS in the epoxy resin. This heating was done under a reduced pressure of $10^{-2}$ Torr to remove volatile materials, such as, water and to degas the mixture as it was cooled to near room temperature. This mixture was dispersed onto a substrate to form a film. The substrate was an indium-tin-oxide (ITO) coated glass in which the ITO film was overcoated with a dielectric layer to reduce the current across the sample during the poling process. The dielectric coating was itself overcoated by a plasma polymerized film of tetrafluoroethylene. The epoxy mixture was dispersed onto the dielectrically coated substrate. Another dielectrically coated substrate was placed on top of the substrate with the polymer dispersed on its surface with the two dielectrically coated electrodes facing one another. In addition, a 25 micron spacer layer was placed between the electrodes so that a uniform thickness film could be obtained and the entire assembly was held together with spring clamps. This assembly was heated in an over to about 220° C. for 2 hours. As the assembly was cooled a voltage was applied across the sample to orient the NLO functionalities. The voltage was increased to produce an electric field strength in the epoxy mixture of about 600,000 V/cm. The sample was cooled slowly to room temperature to allow the sample to anneal and densify. The polymerized sample was removed from the substrates and tested for second harmonic generation capability by the Maker fringe technique. The second harmonic coefficient was determined by calibrating the input energy density with a quartz crystal, knowing the film thickness, and the index of refraction at the incident frequency of 1.064 microns and the second harmonic frequency of 532 nm. The index of refraction was determined by fitting the refractive index data taken with a variable wavelength Abbe refractometer for a similarly prepared sample. The index at 1.064 microns was 1.606 and the index at 532 was 1.632. The $d_{33}$ value was about $8 \times 10^{-9}$ esu.

Table 1 shows Example 1 (Sample 3) and other samples prepared using the same stoichiometric ratios of DGEBA resin and DADS curing agent as in Sample 3. The samples were poled at different field strengths. Table 1 shows the prepared sample poled at different field strengths and the measured value of the second harmonic coefficient $d_{33}$.

TABLE 1

| Sample # | Electric Field (megavolt/cm) | SHG Coefficient (esu) |
|---|---|---|
| 1 | 0.3 | $4.0 \times 10^{-9}$ |
| 2 | 0.3 | $5.5 \times 10^{-9}$ |
| 3 | 0.6 | $8.2 \times 10^{-9}$ |
| 4 | 0.7 | $1.05 \times 10^{-8}$ |

This Table shows the approximately linear response of the susceptibility to the electric field strength and intercept near the origin.

EXAMPLE 5

A. Production of Sample

A mixture of DGEBA and DADS was prepared with a stoichiometric ratio of resin and curing agent similar to that described in Example 1. The mixture was heated briefly to about 160° C. to dissolve the DADS into the epoxy resin. This mixture was added to propylene glycol methyl ether (Dowanol PM ® obtained from The Dow Chemical Company) in a ratio of about 1:4 by weight. A quartz substrate having a thickness of about 125 microns was cleaned and dipped into and pulled out of this mixture at a rate of about 2 mm/sec. The solution of resin and curing agent was washed from one side of the quartz substrate with a solvent. The coated substrate was placed in a clean room oven at 100° C. for one hour and 160° C. for one hour. The coated substrate was then placed in a vacuum oven at a pressure of about at least $10^{-2}$ Torr for one hour. The glass transition of similarly prepared polymer samples is about at least 210 °C. The polymer coated quartz substrate was then placed between two parallel electrodes with a 0.5 micron polyimide spacer adjacent to the polymer side of the quartz substrate to prevent the electrode from contacting the polymer surface. The sample was poled at about 250,000 v/cm. The temperature of the sample was slowly reduced to room temperature to allow the sample to anneal and densify. After a period of about 4 hours the field was removed. The sample was removed from between the electrodes for further testing.

B. Waveguiding Properties

The sample obtained in A above was tested for its waveguiding capabilities. The sample was placed in a holder on a rotation stage. A coupling prism was pressed against the polymer side of the polymer coated quartz substrate in a manner similar to that described in the Proceedings SPIE edited by G. Khanarian, volume 971, page 218 and other references therein. A laser beam having a wavelength of 0.6471 microns and a transverse electric (TE) polarization was directed at the coupling prism so as to efficiently launch a waveguiding mode. The zeroth, first and second order modes were observed at the coupling angles 26.97, 22.45 and 17.6, respectively. The losses in this film due to scattering and absorption were estimated to be less than 1 db/cm.

C. Nonlinear Optical Properties

The sample obtained in A above was tested for its nonlinear optical capabilities using the Maker fringe technique. The sample was tested similarly to that described in Example 1. The polymer coated substrate was affixed to a stainless steel holder which fits onto the rotation stage. The sample was illuminated by a focused laser beam having a 1.064 micron wavelength, an intensity at the sample of less than 0.02 millijoules per pulse, and p-polarization. The sample was rotated about an axis perpendicular to the incident beam. The second harmonic light emitted from the sample as a function of incident angle was detected by a photomultiplier and collected by a boxcar which was synchronized to the laser pulse. The averaged output of the boxcar was collected by a computer and fit to a function to determine the $d_{33}$ value as described by K. Singer et al., ID. The energy density incident on the sample was determined by the response of a Y cut quartz sample having a $d_{11} = 1.1 \times 10^{-9}$ esu placed in the same position as the sample immediately before testing. Using an index of refraction at 1.064 microns of 1.60 and an index at 532 nm of 1.63, and a thickness of about 1 micron the $d_{33}$ was determined to be about $6 \times 10^{-9}$ esu.

D. Stability of the NLO Properties

The second harmonic generation coefficient for the sample obtained in A above was constant at room temperature over a period of 3 days. The second harmonic generation coefficient of the sample was then measured at room temperature after exposure to elevated temperatures for 20 minutes. The sample was removed from the testing apparatus but left affixed to the stainless steel holder so that the same point in the sample can be repeatedly tested after thermal exposure. The sample was placed in an oven and allowed to equilibrate at a particular temperature for 20 minutes. The sample was then removed from the oven and the second harmonic generation coefficient was measured after the temperature returned to room temperature. Table 2 shows the second harmonic coefficient after exposure to elevated temperature relative to its initial value. In accordance with the present definition of "stable" polymer herein, this polymer is stable up to 150° C.

TABLE 2

| Temperature (° C.) | Second Harmonic Coefficient (esu) |
|---|---|
| 22 | $6.2 \times 10^{-9}$ |
| 50 | $5.9 \times 10^{-9}$ |
| 80 | $5.8 \times 10^{-9}$ |
| 125 | $4.4 \times 10^{-9}$ |
| 150 | $4.1 \times 10^{-9}$ |

EXAMPLE 6

In a 100 ml boiling flask 3.764 g of DGEBA having an epoxide equivalent weight of 180.5 was combined with 1.0439 g of 4,4'-aminophenyl ether (or alternatively oxydianiline (ODA)). The mixture was heated to facilitate dissolution of the ODA into the epoxy resin. A film was made in the same manner as described in Example 1. This sample was removed from the substrates after polymerization and poling and tested using the Maker fringe technique as in Example 1. The second harmonic coefficient was calculated based on a 25 micron film thickness, an index of refraction at 532 nm of 1.63 and an index at 1.064 microns of 1.60. The calculated value for $d_{33}$ was at least $1 \times 10^{-9}$ esu.

EXAMPLE 7

The solution of epoxy resin and curing agent in propylene glycol methyl ether used in Example 5 was used to coat a standard microscope slide. It was polymerized in the same manner as described in Example 5. Without further treatment the coated slide was tested for third harmonic generation capabilities using the Maker fringe technique. The sample was illuminated with a pulsed light source having a wavelength of 1.9 microns focused on the sample. The sample was mounted on a computer controlled rotation stage and within a vacuum cell to reduce background third harmonic. The transmitted light was filtered to remove wavelengths other than the generated third harmonic. This filtered radiation was detected by a photomultiplier and averaged by a boxcar. The averaged output of the boxcar was collected as a function of the angle of incidence of the input radiation. The third harmonic susceptibility was calculated by a computer fitting of the data. The routine required the approximate indices of refraction at 1.9 microns of 1.602 and at 633 nm having an index of 1.620 and the thickness of the film was measured to be about 1.3 microns. The third harmonic susceptibility was calculated to be $8.1 \times 10^{-13}$ esu or about 30 times the signal obtained from quartz.

EXAMPLE 8

7.014 g (0.043 epoxide equivalents) of a trifunctional epoxy resin TACTIX ® 742, available from The Dow Chemical Company, 1.777 g (0.010 epoxide equivalents) of a bisphenol A based epoxy resin D.E.R. ® 383, and 3.432 g (0.055 amine equivalents) of 4,4'-diaminodiphenyl sulfone (DADS) were mixed in a 100 ml single neck flask. D.E.R. ® 383 was used at 25 weight percent to reduce the viscosity of TACTIX ® 742. A low molecular weight epoxy prepolymer was prepared by heating under a nitrogen atmosphere at 140° C. for 15 minutes.

The resulting product was cooled to room temperature and dissolved in 10 ml. of tetrahydrofuran (THF). This solution was filtered through a 1 μm filter to remove particulates.

A thin film of this product was prepared by placing a microscopic slide in a jar containing the filtered, above described THF solution and the jar was tipped on its side for 5 minutes to allow the solution to wet the slide. Then the jar was slowly placed upright to drain the solvent off the slide. The solvent was slowly evaporated from the film by leaving the slide in the jar for 10 minutes with the cover on. The films were typically 1.5–1.9 μm in thickness.

The above-obtained film was simultaneously fully cured while being poled by placing on a corona poling block in a vacuum oven subjected to a nitrogen atmosphere. A corona field of 5000 V was applied with a corona needle placed 1 cm above the film, and the oven temperature was raised to 150° C. The sample was heated at 150° C. for 1 hour and then at 220° C. for 3 hours. The film was then cooled to room temperature while leaving the corona field on. The field was left on until the second harmonic generation (SHG) signal was measured using Maker fringe technique. The $d_{33}$ values ranged from $(1.40-3.9) \times 10^{-9}$ esu.

STABILITY OF THE NLO PROPERTIES

Studies on the persistence of NLO activity at 200° C. were performed to illustrate the temperature dependence of the NLO activity. The temperature studies were performed in a vacuum oven to prevent air oxidation of the polymer films at these high temperatures. Prior to the measuring of the SHG signal, the films were removed from the oven and cooled to room temperature. After the SHG signal was measured, the samples were placed back in the oven.

Table 3 shows the measured $d_{33}$ values of the above film of 2.2 μm in thickness at various time intervals to illustrate the persistence of NLO activity at 200° C. In accordance with the present definition of "stable" polymer herein, this polymer exhibits exceptional thermal stability, retaining 73% of its original NLO activity after exposure to a temperature of 200° C. for 13 days.

TABLE 3

| d33 values for [Tactix ® 742/D.E.R. ® 383/DADS] film aged at 200° C. | | |
|---|---|---|
| Time (days) | d33 (10⁻⁹ esu) | Relative % |
| 0 | 3.3 | 100 |
| 2 | 3.0 | 91 |
| 5 | 2.8 | 85 |
| 7 | 2.8 | 85 |
| 9 | 2.7 | 82 |
| 13 | 2.4 | 73 |
| 26 | 1.9 | 58 |

What is claimed is:

1. A nonlinear optical composition comprising the reaction product of:
   (I) at least one compound containing an average of more than one epoxide group per molecule; and
   (II) at least one curing agent for compound (I) whereby at least a portion of said curing agent (II) is represented by the formula:

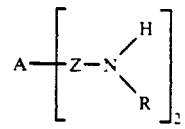

or by the formula:

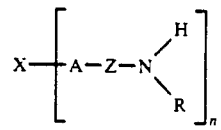

wherein A is a divalent electron-withdrawing group; Z is a conjugated electronic structure, R is independently a hydrogen or an aliphatic, cycloaliphatic or aromatic hydrocarbon having from 1 to about 12 carbon atoms; n is 2 or 3; and X is a divalent or trivalent organic hydrocarbon, hetero-interrupted hydrocarbon, or substituted hydrocarbon radical; or

with the proviso that there are no intervening methylene groups between A and Z, or between A and X, said nonlinear optical composition exhibiting a second order susceptibility of greater than $10^{-9}$ esu.

2. The composition of claim 1 wherein the curing agent is a compound having the following formula:

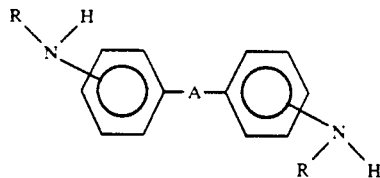

Formula I where A is a divalent electron-withdrawing group and each R is independently a hydrogen or an aliphatic, cycloaliphatic or aromatic hydrocarbon having from 1 to about 12 carbon atoms with the proviso that there are no methylene groups attached to A.

3. The composition of claim 1 wherein the curing agent is a compound having the following formula:

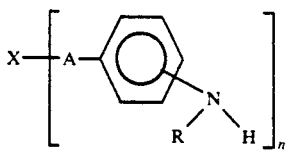

where A is a divalent electron-withdrawing group; n is 2 or 3; each R is independently a hydrogen or an aliphatic, cycloaliphatic or aromatic hydrocarbon having from 1 to about 12 carbon atoms; and X is a divalent or trivalent organic hydrocarbon, hetero-interrupted hydrocarbon, or substituted hydrocarbon radical or

with the proviso that there are no methylene groups between A and X, or between A and the phenyl group.

4. The composition of claim 1, 2 or 3 wherein the divalent electron-withdrawing group is selected from the group consisting of

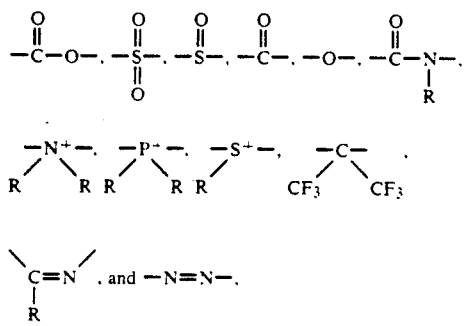

wherein each R is independently a hydrogen or an aliphatic, cycloaliphatic or aromatic hydrocarbon having from 1 to about 12 carbon atoms.

5. The composition of claim 3 wherein A is $SO_2$ and R is hydrogen.

6. The composition of claim 1 wherein component (I) is an epoxy compound containing an average of more than one glycidyl group per molecule.

7. The composition of claim 5 or 6, wherein component (I) is a glycidyl ether of 4,4',4"-trihydroxyphenyl methane.

8. An article having nonlinear optical properties comprising a substrate coated with the composition of claim 1.

9. A particle film, fiber or sheet of the composition of claim 1.

10. A device having the nonlinear optical composition of claim 1 incorporated therein.

11. A waveguide having as one component a nonlinear optical composition of claim 1.

12. The nonlinear optical composition of claim 2 or 3 wherein the amine is in the para position relative to the electron-withdrawing group A.

13. The composition of claim 1, 2, or 3 including a catalyst.

14. The composition of claim 13 wherein the catalyst is selected from the group consisting of tertiary amines, phosphonium compounds, ammonium compounds, sulfonium compounds, and mixtures thereof.

15. The composition of claim 13, wherein the catalyst is imidazole or substituted imidazole.

16. The composition of claim 3 wherein A is CO and R is hydrogen.

17. The composition of claim 1 wherein curing agent (II) includes a second curing agent.

18. The composition of claim 17 wherein the second curing agent is selected from the group consisting of amines, amides, sulfides, anhydrides and combinations thereof.

19. The composition of claim 18 wherein the second curing agent is an aromatic amine.

20. The composition of claim 19 wherein the second curing agent exhibits a nonlinear optical response.

21. The composition of claim 1, 2, or 3 wherein the component (I) is a glycidyl ether of bisphenol A.

22. The composition of claim 20 wherein the component (I) is a glycidyl ether of 4,4',4"-trihydroxyphenyl methane.

* * * * *